(12) United States Patent
Arias et al.

(10) Patent No.: US 8,434,257 B2
(45) Date of Patent: May 7, 2013

(54) APPARATUS TO FISH

(76) Inventors: Pedro J. Arias, Miami, FL (US); Miguel E. Fernandez, Miami, FL (US)

( * ) Notice: Subject to any disclaimer, the term of this patent is extended or adjusted under 35 U.S.C. 154(b) by 48 days.

(21) Appl. No.: 13/197,376

(22) Filed: Aug. 3, 2011

(65) Prior Publication Data

US 2013/0031823 A1     Feb. 7, 2013

(51) Int. Cl.
    *A01K 91/06*     (2006.01)
    *A01K 97/06*     (2006.01)

(52) U.S. Cl.
    USPC ............................. 43/4; 43/43.1; 43/54.1

(58) Field of Classification Search ............ 43/4, 15–17, 43/43.1, 43.11, 43.14, 54.1, 56, 57.2, 57.3
See application file for complete search history.

(56) References Cited

U.S. PATENT DOCUMENTS

| | | | |
|---|---|---|---|
| 1,625,988 A | | 4/1927 | Dice |
| 2,517,867 A | * | 8/1950 | Glahn ........................ 242/137.1 |
| 2,603,429 A | | 7/1952 | Jaworowski |
| 2,757,881 A | | 8/1956 | Halsey |
| 3,174,703 A | | 3/1965 | Falkum |
| 4,082,235 A | | 4/1978 | Dauvergne |
| 4,168,042 A | | 9/1979 | Joe et al. |
| 4,229,900 A | | 10/1980 | Collins |
| 4,607,449 A | | 8/1986 | Brachear |
| 4,688,740 A | | 8/1987 | Weeks et al. |
| 4,756,412 A | * | 7/1988 | Graves et al. ............ 206/315.11 |
| 4,831,762 A | * | 5/1989 | Harris ................. 43/17 |
| 4,862,636 A | | 9/1989 | Doskocil et al. |
| 4,864,769 A | * | 9/1989 | Sandahl ............. 43/55 |
| D307,457 S | | 4/1990 | Corrie |
| 5,033,225 A | * | 7/1991 | Waldroop et al. ............ 43/43.11 |
| D355,735 S | * | 2/1995 | Shaffer et al. .................. D32/53 |
| 5,542,206 A | * | 8/1996 | Lisch ............................. 43/54.1 |
| 5,547,098 A | * | 8/1996 | Jordan ....................... 220/23.86 |
| 5,755,057 A | * | 5/1998 | Dancer ......................... 43/54.1 |
| 5,758,449 A | * | 6/1998 | Munsterman et al. ............ 43/17 |
| 5,829,181 A | * | 11/1998 | Fielder et al. ..................... 43/17 |
| 6,029,391 A | * | 2/2000 | Holley et al. ................ 43/43.11 |
| 6,092,325 A | * | 7/2000 | Walker ....................... 43/43.11 |
| 6,401,382 B2 | * | 6/2002 | Larkin ........................ 43/43.11 |
| 6,763,629 B1 | * | 7/2004 | Bennett ............................. 43/16 |
| 6,796,076 B1 | | 9/2004 | Bennett |
| 6,854,207 B1 | | 2/2005 | Strope |
| 7,913,446 B1 | * | 3/2011 | Aldridge, III .................. 43/57.1 |

\* cited by examiner

*Primary Examiner* — David Parsley
(74) *Attorney, Agent, or Firm* — Albert Bordas, P.A.

(57) ABSTRACT

An apparatus to fish having a body with exterior and interior faces extending from a first edge to a first end. At least one shaped channel is defined at the interior face, each shaped channel has a first channel extending from the first edge, and a second channel extending from the first channel. The body further has a first wall that extends from the interior face at a first predetermined distance from the first edge. A housing assembly is removably mounted into the body. The housing assembly has a second wall with a second edge, a first base wall with a third edge, and a housing. A first outside diameter of the second wall is smaller than a first interior diameter of the interior face. Protrusions protrude from the second edge; and a handle fixed to the interior face.

15 Claims, 3 Drawing Sheets

APPARATUS TO FISH

BACKGROUND OF THE INVENTION

1. Field of the Invention

The present invention relates to fishing gear, and more particularly, to an apparatus to fish.

2. Description of the Related Art

Applicant believes that one of the closest references corresponds to U.S. Pat. No. D307457 issued to Corrie on Apr. 24, 1990 for a fishing hand caster. However, it differs from the present invention because Corrie teaches a design for a fishing hand caster of a different physical and ornamental shape.

Applicant believes that another reference corresponds to U.S. Pat. No. 6,854,207 issued to Strope on Feb. 15, 2005 for a fishing line spool for jug fishing. However, it differs from the present invention because Strope teaches a fishing line spool with different sizes of female threads for removably attaching to a threaded neck of a plastic bottle to create a jug line used for jug fishing. The spool is removed from the bottle for storage. The spool is provided with a line spool area around which fishing line is wrapped to store the line and with a double walled protection flange provided with penetrable material to receive the pointed end of hooks when the fishing line is not in use. A locking pin removably extends through pin openings provided on either side of the spool area to prevent fishing line from unwinding from the thread spool area and as a means of fixing the depth of the fishing line. The locking pin can be removed from the pin openings to allow the fishing line to be wrapped onto or unwrapped from the spool area.

Applicant believes that another reference corresponds to U.S. Pat. No. 6,796,076 issued to Bennett on Sep. 28, 2004 for a float supported fishing apparatus with automatic hook set. However, it differs from the present invention because Bennett teaches a free floating fishing apparatus includes a float and a spool that is positioned on the float for holding a supply of line to be dispensed. A line holding beam is mounted on the float and has a line guide that enables fishing line to be spooled from the spool through the line guide and then underwater for fishing. Rigging such as a hook, sinker or the like can be attached to the free end portion of a line. The spool is comprised of two sections, a non-rotating section, which is received over the float and a rotating section received over the non-rotating section. A finite length of line is wound on the rotating section and a selected amount is payed out prior to fishing. The free end of the payed out line is attached to a hook and perhaps a float and the float and hook are dropped into the water. Depending upon the amount of line wound and whether the spool sections are locked during fishing, a finite amount of line may pay our after the fish has struck the hook.

Applicant believes that another reference corresponds to U.S. Pat. No. 4,862,636 issued to Doskocil, et al. on Sep. 5, 1989 for a hand-held trotline holder. However, it differs from the present invention because Doskocil, et al. teach a hand-held trotline holder adapted for safety accumulating, storing, and dispensing a trotline having a main line with spaced drop lines carrying hooks. The trotline holder includes an arcuate handgrip and spool-like member that rotates with respect to the handgrip. The spool-like member comprises a hollow cylindrical hub with two circular flanges; one of those flanges is attached at each of the two ends of the hub. The trotline is accumulated around the hub and contained between the two flanges. The hub is adapted to rotate about its central (longitudinal) axis, and the two flanges (which are preferably formed integrally with the hub) therefore rotate in planes perpendicular to the hub's central axis. Rigidly affixed to the outer face of the first flange is a series of peripherally and outwardly opening compartments; each compartment has at least one radially extending slot for storing one or more hooks attached to the drop lines. The second flange has affixed thereto an external knob, which is adapted to be grasped for turning the spool about its central axis. Permanently mounted within the cylindrical spool hub is a handgrip, which is adapted for rotatably supporting the spool. A portion of the handgrip acts as a guard or shield between the user's hand (which hand is supporting the spool) and the points and barbs of hooks that are captured within the compartments. The handgrip also preferably includes a structure, which permits control of the rotation of the spool with respect to the handgrip. In one embodiment, a handgrip is configured so that the user's thumb may extend over the top of the handgrip for a short distance in order to bear against a portion of the spool in such a way as to inhibit rotation thereof. This is done by sizing the shield so that the end of the thumb may engage a sidewall of one of the adjacent compartments (thereby preventing the compartment from rotating with respect to the user's hand). In another embodiment, a protuberance carried by a flexible portion of the handgrip may be moved to a position where it interferes with free rotation of the spool. By flexing the handgrip portion so as to force interference between the protuberance and one or more sidewalls of the compartments, rotation of the compartments about the central axis can be selectively retarded and/or prevented. A typical embodiment will have first and second flanges about 10 inches in diameter, and will have some 23 compartments with associated slots, each of which may conveniently hold up to 5 or 6 substantial hooks. Such a holder can accommodate over 250 feet of main line and about 5° drop lines with their associated hooks. All of this can be accomplished with a holder that is relatively compact (i.e., capable of being placed in an envelope of about 165 cubic inches) and which will weigh only about 4½ pounds.

Applicant believes that another reference corresponds to U.S. Pat. No. 4,688,740 issued to Weeks, et al. on Aug. 25, 1987 for a hand held reel. However, it differs from the present invention because Weeks, et al. teach a hand reel for fishing line formed by an outer annular member rotatable about an inner annular member, both the inner and outer members are made of two annular halves, an outer peripheral surface of the outer annular member is of a generally U-shaped radially outwardly opening configuration as viewed in radial cross-section to accommodate fishing line thereupon, the inner annular member has a plurality of circumferentially spaced radially outwardly opening slots which guidingly receive an innermost circumferential edge of the outer annular member for guiding relative rotation between the two annular members, a slot formed in at least one of the inner annular member halves receives a brake mechanism spring biased axially outwardly and having an axial inboard end portion in bearing engagement against an annular braking surface portion of the outer annular member, the braking mechanism also includes an axially outboard end portion manually manipulable by the fingertips of a user's hand to selectively regulate the braking force to effectively create desired "drag" when utilizing the hand reel to fight a fish, the outer annular member halves having interengaged hooks and ledges along the annular braking surface portion which emit an audible sound as the braking mechanism inboard end portion moves therealong upon relative rotation of the outer annular member about the inner annular member, and the inboard end portion of the braking mechanism preferably being one or more balls each urged by a compression spring toward the annular braking surface portion.

Applicant believes that another reference corresponds to U.S. Pat. No. 4,607,449 issued to Brachear on Aug. 26, 1986 for a fishing jug. However, it differs from the present invention because Brachear teaches a fishing jug comprises a floatable, hollow housing with a generally cylindrical sidewall and top and bottom end walls. A hollow, inverted U-shaped handle with a removable seal plug is connected to the top end wall in communication with the interior of the housing. There is a reduced-diameter neck in the lower portion of the sidewall having an external, toroidal surface of concave, parti-circular cross-section extending completely around the housing. There is a downwardly enlarged, flared lower ballast compartment between the neck and lower end wall. One or more hook-engageable loops are outstanding from the neck but are entirely recessed within a cylindrical projection of the sidewall. The loops are offset from a minimum diameter section of the neck.

Applicant believes that another reference corresponds to U.S. Pat. No. 4,229,900 issued to Collins on Oct. 28, 1980 for a fishing apparatus. However, it differs from the present invention because Collins teaches a fishing apparatus, including a relatively short tubular cylinder around which fishing line is wound, the cylinder having a diametric crossbar adapted to be held by one of the hands of the user. The cylinder may have a raised rib or flange around each of its ends to assist in retaining the line thereon. At one side of the cylinder, an inwardly flared recess is provided adjacent the end of the crossbar, whereby the crossbar may be grasped by the fingers of one hand while the thumb of that hand is disposed in the flared recess in a position to be useful in controlling the line. Mirror image flared recesses may be provided, one at each end of the crossbar, in positions whereby one may be used when the drum is held in one hand and the other may be used when the drum is held in the opposite hand. The apparatus is, therefore, adapted for use by either right-handed or left-handed persons. Casting of the line is accomplished by swinging the free end of the line in a circle and then releasing it at a rapid velocity. Withdrawal of line from the cylinder during casting and drag on the line may be controlled by adjusting the angle of the cylinder to the cast direction. In one embodiment, a transverse bar is provided which permits rotation of the cylinder and provides additional means for controlling drag on the line. The free hand is used in rewinding of the line about the cylinder, by drawing in lengths of line and manipulating the cylinder and line to accomplish the rewinding.

Applicant believes that another reference corresponds to U.S. Pat. No. 4,168,042 issued to Joe, et al. on Sep. 18, 1979 for a kite string reel structure. However, it differs from the present invention because Joe, et al. teach a kite string reel structure of such hollow internal configuration that a hand of a user may be removably disposed therein, and the hand when clenched grasping a transverse handle within the reel structure to support the latter in a desired position where the other hand of the user may be employed to wrap kite string on the reel or pay out kite string therefrom. When the reel structure is disposed in a substantially parallel direction to the kite string when a kite is being flown, the pull on the kite string will automatically cause a rapid pay out of kite string from the reel.

Applicant believes that another reference corresponds to U.S. Pat. No. 4,082,235 issued to Dauvergne on Apr. 4, 1978 for a pole-less fishing rig. However, it differs from the present invention because Dauvergne teaches a fishing rig comprised of a simple spool of about five inch diameter, which contains the fishing line, with a handle, attached to its rear face, and its forward lip flared to permit easy dispersal of the contained fishing line. The central cavity formed by the flared front lip can be divided into compartments for storage of other fishing items, with a snap plastic lid to retain said items within their respective compartments. The compact and portable fishing rig is readily stored in a typical bureau or cabinet drawer, and can be hooked on the belt for hiking. In use, it is easily hand cast, as a slingshot would be used.

Applicant believes that another reference corresponds to U.S. Pat. No. 3,174,703 B1 issued to Falkum on Mar. 23, 1965 for a line-storing reel. However, it differs from the present invention because Falkum teaches a line storing reel that comprises a spool fashioned from a simple annular band, which provides a satisfactory ring-like member. The band in transverse cross-section is fashioned into a shallow endless channel by flaring the circumferential marginal edges. This channel facilitates winding the line thereon when the line is being retrieved. In addition, it facilitates spinning of the whorls off when the line is initially thrown by hand and then allowed to payout in a generally well-known manner.

Applicant believes that another reference corresponds to U.S. Pat. No. 2,757,881 issued to Halsey on Aug. 7, 1956 for a hand line drum. However, it differs from the present invention because Halsey teaches a hand line drum adapted for reeling in and paying out lines, such as fishing lines, kite string and other like light lines.

Applicant believes that another reference corresponds to U.S. Pat. No. 2,603,429 issued to Jaworowski on Jul. 15, 1952 for TITLE. However, it differs from the present invention because Jaworowski teaches a methods of and apparatus for casting a fishing line, controlling the flight of the line, and retracting or retrieving the line after the cast has been made. More particularly, it relates to a line-holding and casting-control device from which the line may be permitted to unwind and slip off, without rotation of the device, in a direction generally parallel to the longitudinal axis of the device. Preferably, but not necessarily, the device takes the form of an annular spool member having a central opening permitting manipulation of the device by the user without interference from a rod or other auxiliary equipment of the kind usually employed.

Applicant believes that another reference corresponds to U.S. Pat. No. 1,625,988 issued to Dice on Apr. 26, 1927 for a fishing devise. However, it differs from the present invention because Dice teaches a device for paying out and reeling in the fishing line in casting, and also comprises a weighted attachment for the end of the line. The device for casting, which does not require a pole or rod; to payout the line without resistance or interference; to arrange the reel on which the line is wound so that the line feeds off the end of the reel in casting without necessitating rotation of the reel; to wind the line on the reel so that it will readily feed off of the end of the reel when the cast is made; to provide an improved weighted attachment for the end of the line; to hold the hook at an elevation above the bottom of the body of water so that it swings freely and does not catch on vegetation or other impediments at the bottom of the body of water.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an apparatus to fish that comprises a body having a lip that securely and removably receives the tip of a fishing hook connected to the distal end of a fishing line winded around the body.

It is another object of this invention to provide an apparatus to fish comprising a handle.

It is another object of this invention to provide an apparatus to fish comprising a housing assembly removably mounted to the body and having a housing to store spare hooks and weights.

It is another object of this invention to provide an apparatus to fish that have several closed cavities that act as air chambers to keep the instant invention, assembled or in parts, floating in the event it is dropped into water.

It is another object of this invention to provide an apparatus to fish, which housing assembly has peripheral channels to wind spare fishing lines.

It is another object of this invention to provide an apparatus to fish that is volumetrically efficient for carrying, transporting, and storage.

It is another object of this invention to provide an apparatus to fish that can be readily assembled and disassembled without the need of any special tools.

It is another object of this invention to provide an apparatus to fish, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
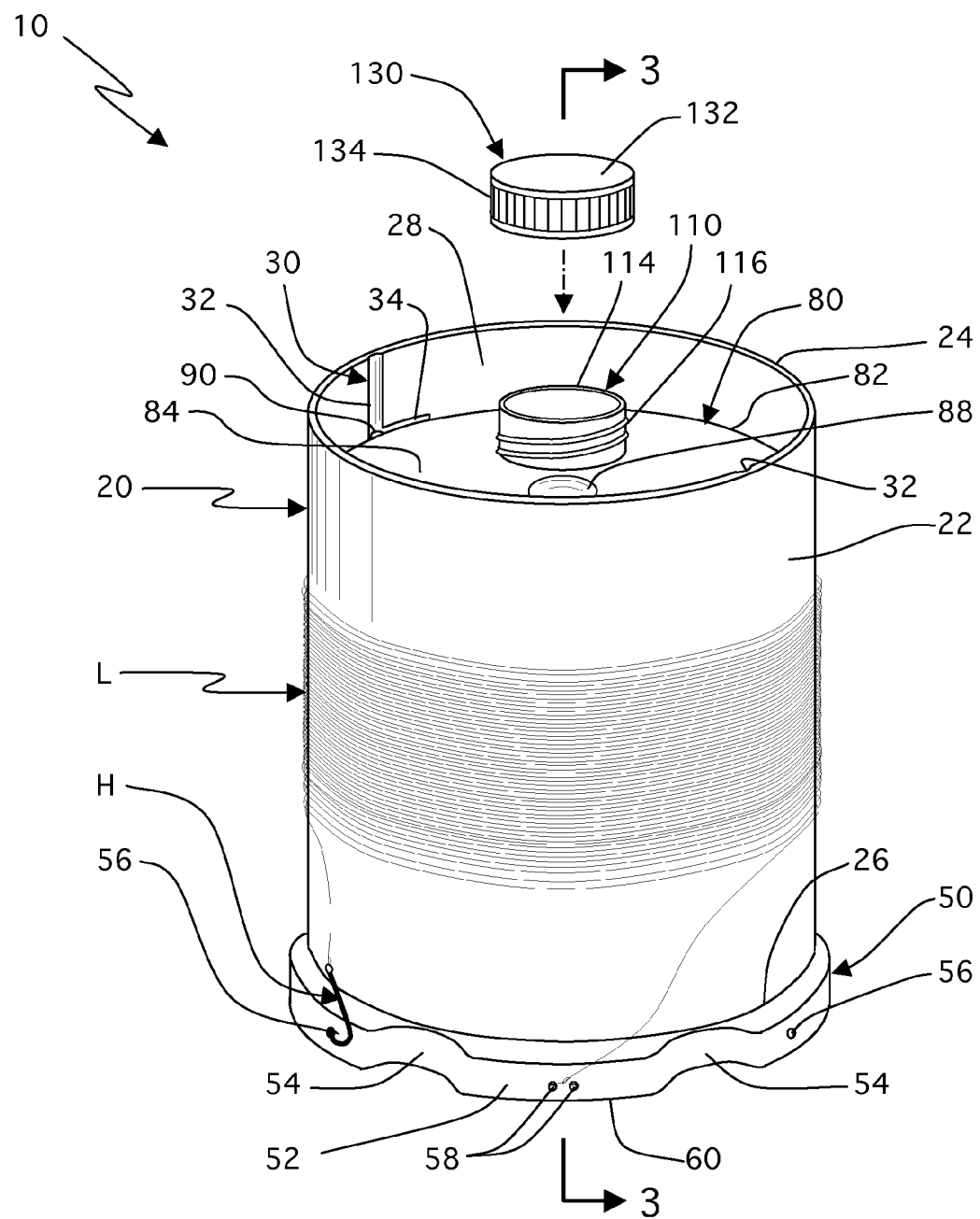
FIG. 1 represents an isometric view of instant invention.

Referring now to the drawings, the present invention is generally referred to with numeral 10. It can be observed that it basically includes body 20, handle 70, housing assembly 80, and cap assembly 130.

As seen in FIG. 1, body 20 comprises exterior and interior faces 22 and 28 extending from edge 24 to end 26. At least one L-shape channel 30 is defined at interior face 28. Each L-shape channel 30 has channel 32 extending from edge 24, and channel 34 extending from channel 32. Channel 34 is at an angle from channel 32, and in a preferred embodiment, channel 34 is perpendicular to channel 32.

Lip assembly 50 is defined at end 26. Lip assembly 50 comprises edge 60 and sidewall 52 having at least one indent 54, where a user can place his/her thumb thereon for grasping/gripping purposes. At least one aperture 56 and through holes 58 are disposed around sidewall 52. Each at least one aperture 56 securely receives a tip of a respective hook H that is tied to a distal end of line L when apparatus to fish 10 is not in use as illustrated. A proximal end of line L is tied to through holes 58.

Figure 2:
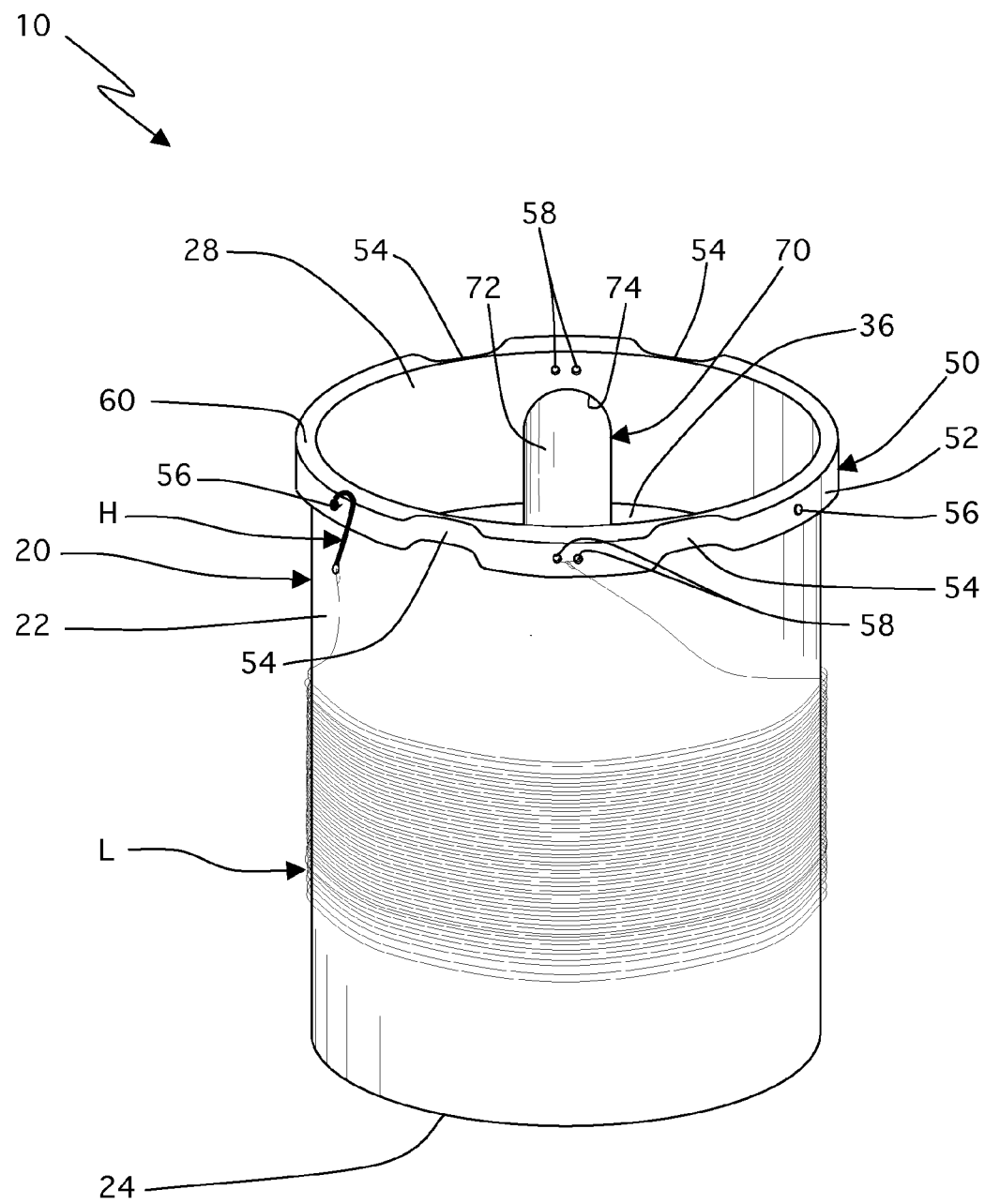
FIG. 2 is an isometric view of the invention longitudinally inverted with respect to the position shown in FIG. 1.

As seen in FIG. 2, wall 36 extends from interior face 28 at a first predetermined distance from edge 24. Handle 70 is transversally fixed to interior face 28 at a second predetermined distance from edge 24. It is noted that the second predetermined distance is greater than the first predetermined distance.

Figure 3:
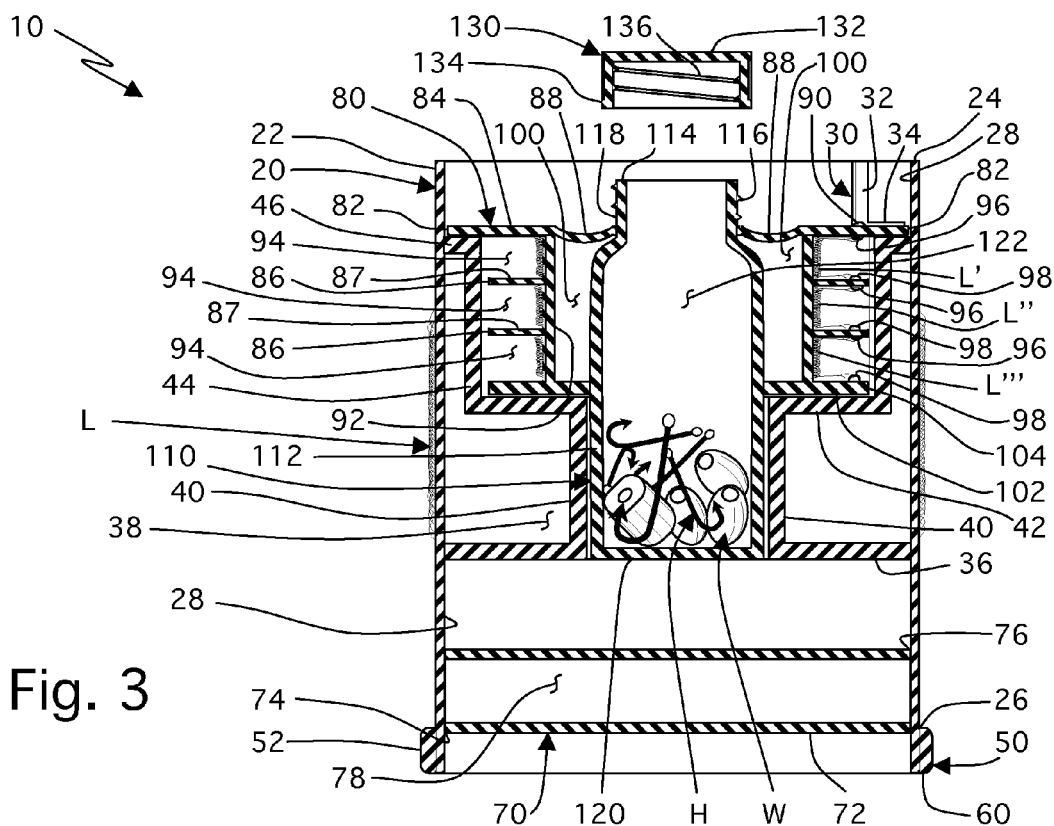
FIG. 3 is a cross-section view taken along line 3-3 from FIG. 1.
Figure 4:
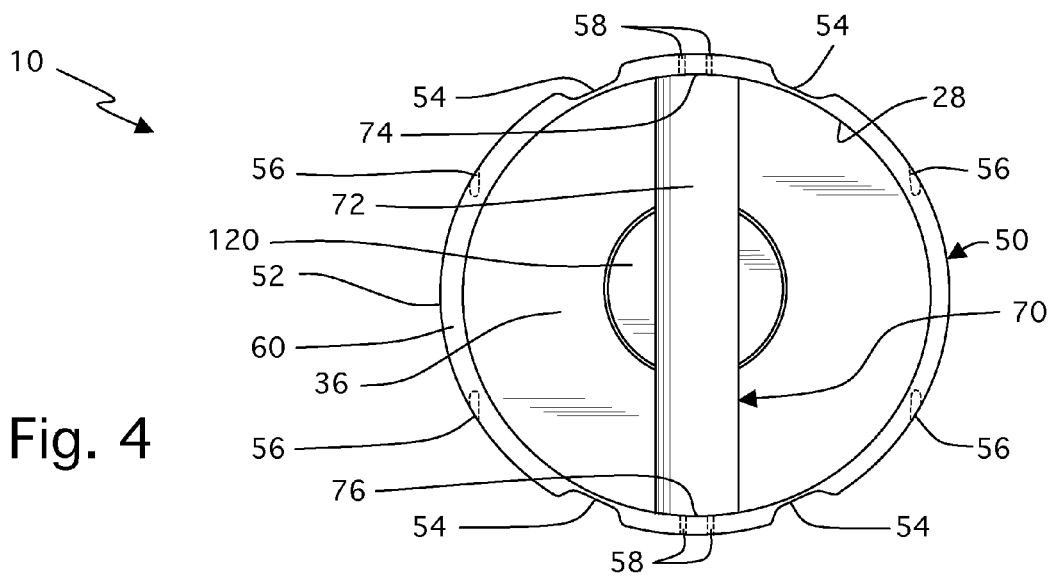
FIG. 4 is a bottom plan view of the invention.

As seen in FIG. 3, handle 70 comprises ends 74 and 76 and sidewall 72 defining internal cavity 78. Cavity 78 serves as an air chamber to make body 20 buoyant/float in water.

Extending contiguously from wall 36, are sidewall 40, base wall 42, sidewall 44 and receiving wall 46. With interior face 28, wall 36, sidewall 40, base wall 42, sidewall 44 and receiving wall 46 define cavity 38. Cavity 38 serves as an air chamber to make body 20 buoyant/float in water.

Housing assembly 80 is removably mounted into body 20. Housing assembly 80 comprises wall 84 with edge 82 having indents 88, base wall 102 with edge 104, and housing 110. The outside diameter of wall 84 is smaller than the interior diameter of interior face 28, and the outside diameter of base wall 102 is smaller then the interior diameter of sidewall 44. Protrusions 90 protrude from edge 82. Sidewall 92 extends from wall 84 to base wall 102 at a predetermined distance from housing 110. Dividers 87 extend outwardly from sidewall 92 to define peripheral channels 94. Dividers 87 have respective divider edges 86. Rings 96 and 98 are mounted at sections of peripheral channels 94. Spare lines L', L" and L'" are winded within peripheral channels 94. The proximal and distal ends of lines L', L" and L'" are secured at respective rings 96 and 98. Spare lines L', L" and L'" may of course be of different lengths, and gauges/diameter, and strengths.

Housing 110 is disposed within housing assembly 80. In a preferred embodiment, housing 110 is centrally disposed. Housing 110 comprises sidewall 112 and base wall 120 that define cavity 122. Cavity 122 is used for storage. As an example, spare hooks H and weights W are stored in cavity 122. Housing 110 further includes neck 118 with edge 114 and threads 116. Wall 84 is fixed to neck 118. Sidewall 92 is spaced apart from sidewall 112. Sidewalls 92 and 112, wall 84 and base wall 102 define cavity 100. Cavity 100 serves as an air chamber to make housing assembly 80 buoyant/float in water. Cap assembly 130 is removably mounted to neck 118. Cap assembly comprises top wall 132, sidewall 134 and threads 136. Base wall 120 and an adjacent section of sidewall 112 have cooperative shape and dimensions to fit within sidewall 40.

It is noted that handle 70 is spaced apart from wall 36 and base wall 120 in such a way that there is enough space to permit a user's hand to fit and grasp handle 70.

To assembly housing assembly 80 into body 20, protrusions 90 are aligned with channels 32 until wall 84 rests against receiving wall 46 and base wall 102 rests against base wall 42. Then, using indents 88 if desired, housing assembly 80 is rotated to force protrusions 90 into channel 34, thus locking housing assembly 80 to housing assembly 20. In a preferred embodiment, wall 36 and base wall 120 are flush when housing assembly 80 is assembled into body 20. The reverse process is used to remove housing assembly 80 from body 20.

In a preferred embodiment, instant invention 10 is made of buoyant matter, and cap assembly 130 does not protrude beyond a plane defined by edge 24 when secured onto neck 118.

The foregoing description conveys the best understanding of the objectives and advantages of the present invention.

Different embodiments may be made of the inventive concept of this invention. It is to be understood that all matter disclosed herein is to be interpreted merely as illustrative, and not in a limiting sense.

What is claimed is:

1. An apparatus to fish, comprising:
   A) a body having exterior and interior faces extending from a first edge to a first end, at least one shaped channel is defined at said interior face, each said at least one shaped channel has a first channel extending from said first edge, and a second channel extending from said first channel, said body further comprises a first wall that extends from said interior face at a first predetermined distance from said first edge, said body further comprises a lip assembly, said lip assembly comprises a first sidewall, and extending from said first wall is a second sidewall, extending from said first wall are a second base wall, and a receiving wall, said lip assembly further comprises at least one aperture and through holes, said body further having fishing line and a fishing hook for fishing, said fishing line is wound around said exterior face when stored and each said at least one aperture securely receives a tip of a respective said fishing hook that is tied to a distal end of said fishing line;
   B) a housing assembly that is removably mounted into said body, said housing assembly comprises a second wall with a second edge, a first base wall with a third edge, and a housing, a first outside diameter of said second wall is smaller than a first interior diameter of said interior face, protrusions protrude from said second edge, a third sidewall extends from said second wall to said first base wall at a second predetermined distance from said housing, dividers extend outwardly from said third sidewall to define peripheral channels for storing wound line, said dividers have respective divider edges, first and second rings are mounted at sections of said peripheral channels; and
   C) a handle fixed to said interior face.

2. The apparatus to fish set forth in claim 1, further characterized in that said first channel is at an angle from said second channel.

3. The apparatus to fish set forth in claim 1, further characterized in that said lip assembly is defined at said first end.

4. The apparatus to fish set forth in claim 1, further characterized in that said first sidewall has at least one indent.

5. The apparatus to fish set forth in claim 1, further characterized in that a proximal end of said fishing line is tied to said through holes.

6. The apparatus to fish set forth in claim 1, further characterized in that said handle is transversally fixed to said interior face at a third predetermined distance from said first edge, said third predetermined distance is greater than said first predetermined distance.

7. The apparatus to fish set forth in claim 1, further characterized in that said handle comprises second and third ends and a fourth sidewall defining a cavity that serves as an air chamber to make said body buoyant and float in water.

8. The apparatus to fish set forth in claim 1, further characterized in that a fourth sidewall extends from said second base wall to said receiving wall, a second outside diameter of said first base wall is smaller then a second interior diameter of said fourth sidewall.

9. The apparatus to fish set forth in claim 8, further characterized in that said interior face, said first wall, said second sidewall, said second base wall, said fourth sidewall and said receiving wall define a cavity that serves as an air chamber to make said body buoyant and float in water.

10. The apparatus to fish set forth in claim 1, further characterized in that said housing comprises a fourth sidewall and a third base wall that define a cavity used for storage.

11. The apparatus to fish set forth in claim 10, further characterized in that said housing further comprises a neck with a fourth edge and threads, said second wall is fixed to said neck.

12. The apparatus to fish set forth in claim 11, further comprising a cap assembly that is removably mounted to said neck.

13. The apparatus to fish set forth in claim 10, further characterized in that said third sidewall is spaced apart from said fourth sidewall, said third and fourth sidewalls, said second wall and said first base wall define a cavity that serves as an air chamber to make housing assembly buoyant/float in water.

14. The apparatus to fish set forth in claim 10, further characterized in that said third base wall and an adjacent section of said fourth sidewall have cooperative shape and dimensions to fit within said second sidewall.

15. The apparatus to fish set forth in claim 1, further characterized in that said second wall has at least one indent.

* * * * *